(12) United States Patent
Hirade

(10) Patent No.: US 7,953,292 B2
(45) Date of Patent: May 31, 2011

(54) SEMICONDUCTOR INTEGRATED CIRCUIT DEVICE AND RENDERING PROCESSING DISPLAY SYSTEM

(75) Inventor: Kazuhiro Hirade, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 902 days.

(21) Appl. No.: 11/869,947

(22) Filed: Oct. 10, 2007

(65) Prior Publication Data

US 2008/0089607 A1    Apr. 17, 2008

(30) Foreign Application Priority Data

Oct. 11, 2006  (JP) ................. 2006-277803
Aug. 29, 2007  (JP) ................. 2007-222113

(51) Int. Cl.
*G06K 9/40* (2006.01)
(52) U.S. Cl. .................. 382/275; 382/260; 382/274
(58) Field of Classification Search .............. 382/260, 382/274, 275
See application file for complete search history.

(56) References Cited

U.S. PATENT DOCUMENTS

| | | | | |
|---|---|---|---|---|
| 5,181,098 A | * | 1/1993 | Guerin et al. | 348/187 |
| 5,953,506 A | * | 9/1999 | Kalra et al. | 709/231 |
| 5,966,208 A | * | 10/1999 | Samuelson | 356/124 |
| 6,453,065 B1 | * | 9/2002 | Lapidous et al. | 382/154 |
| 2002/0191078 A1 | | 12/2002 | Okamoto et al. | |
| 2003/0218683 A1 | | 11/2003 | Kurase | |

FOREIGN PATENT DOCUMENTS

JP    2002-374523 A    12/2002
JP    2003-333588 A    11/2003

* cited by examiner

*Primary Examiner* — Yosef Kassa

(74) *Attorney, Agent, or Firm* — Miles & Stockbridge P.C.

(57) ABSTRACT

An image captured from a camera is subjected to distortion correction processing performed in real time with high accuracy at low cost and is rendered as a smooth image. The image captured from the camera via a capture circuit is stored in a frame memory of a rendering memory unit, and is then subjected to image correction processing by a rendering processing unit. The rendering processing unit adds control points to the image based on distortion information stored in a correction information storing unit, and performs processing so that a shape of a mesh region formed when the control points of the image are connected to one another becomes square by moving the control points. This processing is corrected using, for example, a bilinear filter and the like.

12 Claims, 7 Drawing Sheets

CALCULATE CORRECTION DATA

SEMICONDUCTOR INTEGRATED CIRCUIT DEVICE AND RENDERING PROCESSING DISPLAY SYSTEM

CROSS-REFERENCE TO RELATED APPLICATION

The present application claims priority from Japanese Patent Application No. JP 2007-222113 filed on Aug. 29, 2007, and No. 2006-277803 filed on Oct. 11, 2006, the contents of which are hereby incorporated by reference into this application.

TECHNICAL FIELD OF THE INVENTION

The present invention relates to a processing technique of an image captured from a camera, and in particular to a technique effective in correcting an image used for security support in a vehicle or the like.

BACKGROUND OF THE INVENTION

In recent years, in a vehicle, an image processing technique for parking support or running support has been in practical use, in which a blind spot from the driver's seat such as a field of view of rearward or forward-lateral is visually checked on a monitor such as a vehicle navigation system by using, for example, a CCD (Charge Coupled Device) camera or the like.

In this case, for example, cameras are provided on a front portion, a back portion, and right and left side portions of a vehicle, respectively, and images inputted from such a plurality of cameras are subjected to arithmetic processing and displayed on the monitor.

And, in this kind of image processing, since real-time processing is required from a point of view of safety, high-speed processing is required. And therefore, dedicated hardware using an ASIC (Application Specific Integrated Circuit), a DSP (Digital Signal Processor), or the like is used to perform arithmetic processing without diverting hardware for image processing provided in a vehicle navigation system.

SUMMARY OF THE INVENTION

However, the present inventor has found that following problems exist in such an arithmetic processing technique for an image inputted from a camera as described above.

That is, since hardware dedicated for arithmetic operation for image processing is newly required in a system, a problem such as increase in cost arises in the system.

And, as a camera for backward drive of a vehicle, since a wide range of a display image is required, a camera using a wide-angle lens has been widely used. In the camera using a wide-angle lens, there is a possibility that distortion or the like may occur in four corners of a video due to strain of the lens.

In order to obtain an image with less distortion, there is a technique for correcting distortion of a video by producing a conversion table from a conversion equation for distortion correction utilizing hardware. In this case, the conversion equation is applied to all pixels constituting an inputted image, and further, in order to obscure edges, complementary processing such as filtering or anti-aliasing is performed.

This technique, however, requires hardware having higher-speed arithmetic function (such as a DSP or a high-speed memory) in order to satisfy real-time performance of a video, which results in further significant increasing in cost of the system.

An object of the present invention is to provide a technique capable of performing distortion correction processing in real time at low cost with high accuracy to an image captured from a camera to render the image as a smooth image.

The above and other objects and novel characteristics of the present invention will be apparent from the description of this specification and the accompanying drawings.

The typical ones of the inventions disclosed in this application will be briefly described as follows.

A semiconductor integrated circuit device according to the present invention comprises an image correcting unit performing correction of an image taken by a camera by adding vertex information of a small region to the image based on distortion information and correcting distortion of the vertex information added to the image.

And, in the semiconductor integrated circuit device according to the present invention, the image correcting unit comprises: a capture unit capturing a picture taken by the camera as an image; a correction information storing unit storing distortion information of an optical system of the camera; and an image processing unit correcting the image by reading the image captured by the capture unit when an image capturing signal is inputted, adding the vertex information of the small region to the image based on the distortion information stored in the correction information storing unit, and correcting distortion of the vertex information added to the image.

Further, in the semiconductor integrated circuit device according to the present invention, the image capturing signal inputted to the image processing unit is composed of a signal outputted by the capture unit to the image processing unit when the capture unit captures the image from the camera.

Further, in the semiconductor integrated circuit device according to the present invention, the image processing unit has a MIPMAP (Multum In Parvo MAPing) function, and switches the corrected image using the MIPMAP function when an image capturing signal is inputted.

Further, in the semiconductor integrated circuit device according to the present invention, the distortion information stored in the correction information storing unit is composed of positional information of vertex information with distortion of the optical system of the camera added by capturing a template image with vertex information added at even intervals from the camera.

And, the summary of the other inventions of the present application will be described briefly.

A rendering processing system according to the present invention comprises: a camera taking video; a frame memory storing an image of the camera; a rendering memory storing an image to be displayed; a semiconductor integrated circuit device provided with an image correcting unit correcting distortion of an optical system of the camera in the image stored in the frame memory and outputting a corrected image; and a display unit displaying the corrected image outputted from the semiconductor integrated circuit device. The image correcting unit comprises: a capture unit capturing the video taken by the camera as an image and outputting the image to the frame memory; a correction information storing unit storing distortion information of the optical system of the camera; an image processing unit correcting the image by reading the image stored in the frame memory when an image capturing signal is inputted, adding vertex information of a small region to the image based on the distortion information stored in the correction information storing unit, and correcting distortion of the vertex information added to the image; and a rendering control unit performing display processing so that the corrected image stored in the rendering memory is displayed on the display unit.

And, a rendering processing display system according to the present invention comprises: a camera taking video; a frame memory storing an image of the camera; a correction information storing unit storing distortion information of an optical system of the camera; a rendering memory storing an image to be displayed; a semiconductor integrated circuit device provided with an image correcting unit correcting distortion of the optical system of the camera in the image stored in the frame memory and outputting the corrected image; and a display unit displaying the corrected image outputted from the semiconductor integrated circuit device. The image correcting unit comprises: a capture unit capturing the video taken by the camera as an image and outputting the image to the frame memory; a correction information storing unit storing the distortion information of the optical system of the camera; an image processing unit correcting the image by reading the image stored in the frame memory when an image capturing signal is inputted, adding vertex information of a small region to the image based on the distortion information stored in the correction information storing unit, and correcting distortion of the vertex information added to the image; and a rendering control unit performing display processing so that the corrected image stored in the rendering memory is displayed on the display unit.

Further, in the rendering processing display system according to the present invention, the image capturing signal inputted to the image processing unit is composed of a signal outputted by the capture unit to the image processing unit when the capture unit captures the image from the camera.

And, in the rendering processing display system according to the present invention, the image processing unit has a MIPMAP function, and switches the corrected image using the MIPMAP function when an image capturing signal is inputted.

Further, in the rendering processing display system according to the present invention, the distortion information stored in the correction information storing unit is composed of positional information of vertex information with distortion of the optical system of the camera added by capturing a template image with vertex information added at even intervals from the camera.

And, in the rendering processing display system according to the present invention, the image processing unit compares an undistorted normal image of a template with vertex information added at even intervals and an image of the template captured from the camera, calculates a deviation amount between the vertex information of the normal image of the template and the vertex information of the template captured from the camera, and stores the deviation amount of each vertex information in the correction information storing unit as distortion data.

Further, in the rendering processing display system according to the present invention, the normal image of the template compared by the image processing unit is preliminarily stored in the correction information storing unit.

The effects obtained by typical aspects of the present invention will be briefly described below.

(1) A distorted image captured from a camera can be subjected to correction processing in real time with high accuracy at low cost.

(2) And, speeding up of the correction processing of the distorted image captured from the camera can be achieved.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that the same components are denoted by the same reference symbols throughout the drawings for describing the embodiment, and the repetitive description thereof will be omitted.

Figure 1:
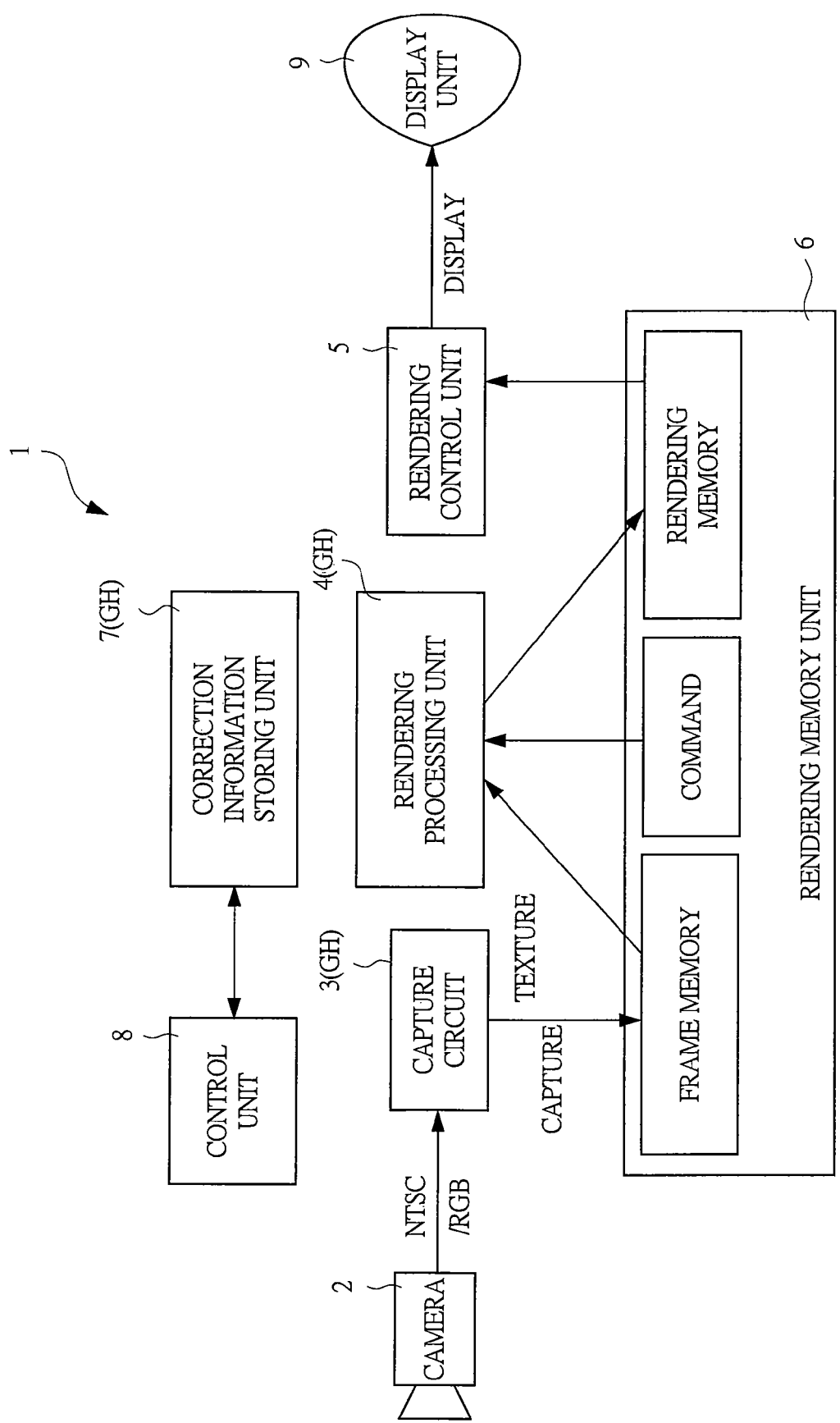
FIG. 1 is a block diagram showing a configuration example of a rendering processing display device according to an embodiment of the present invention.
Figure 2:
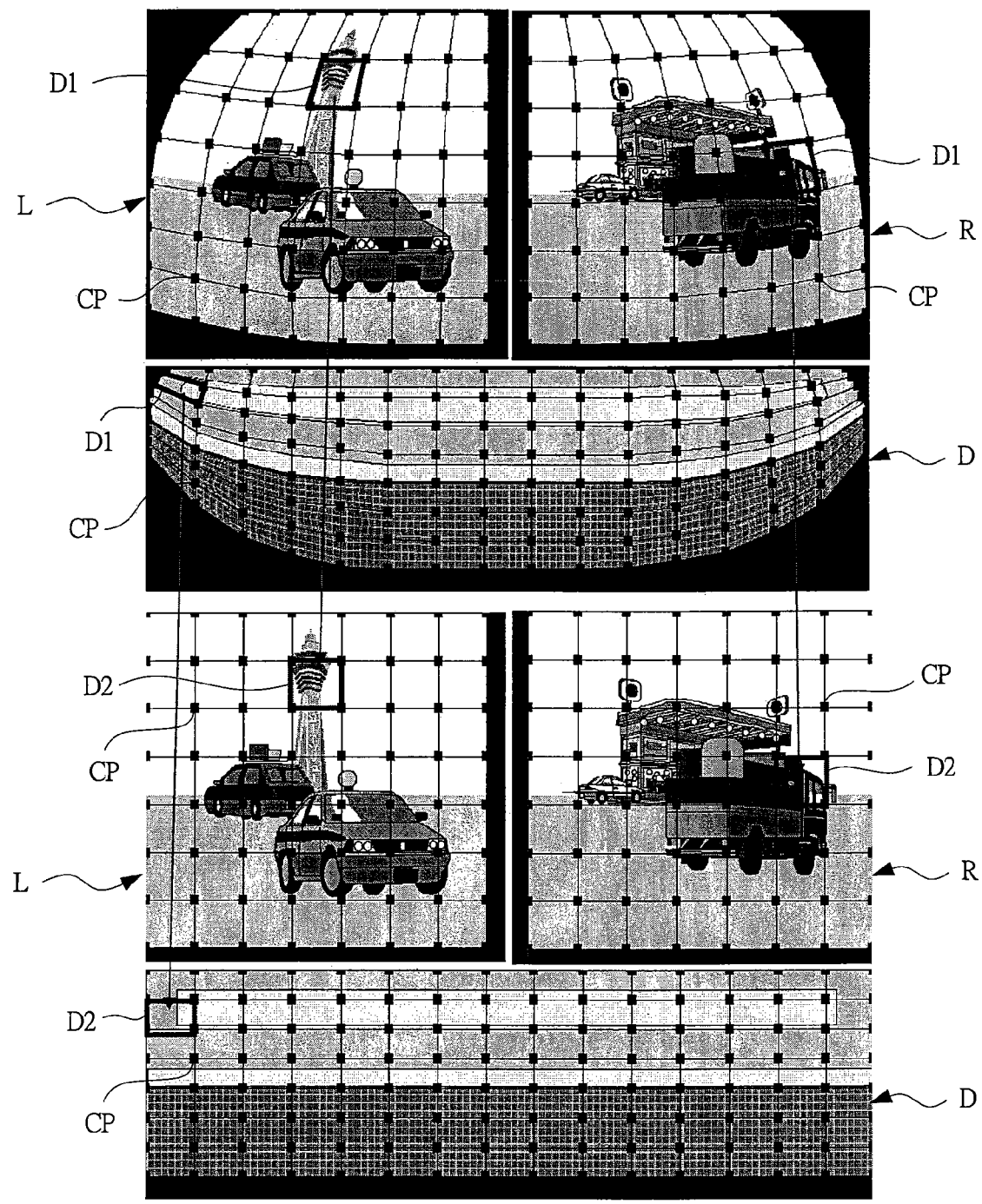
FIG. 2 is an explanation diagram showing an example of image correction processing performed by the rendering processing display device in FIG. 1.
Figure 3:
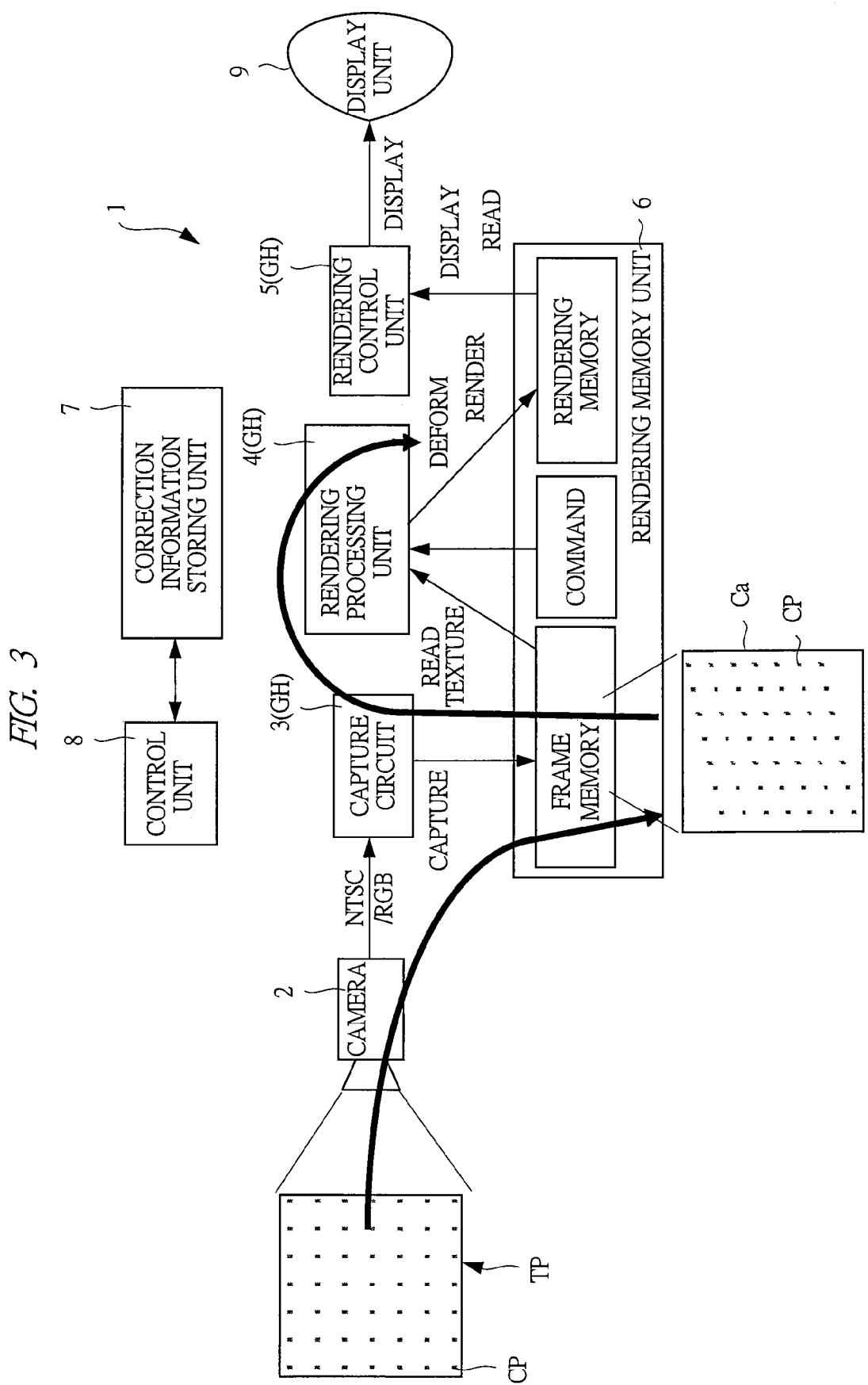
FIG. 3 is an explanation diagram of acquisition of distortion information stored in a correction processing information storing unit provided in the rendering processing display device in FIG. 1.
Figure 4:
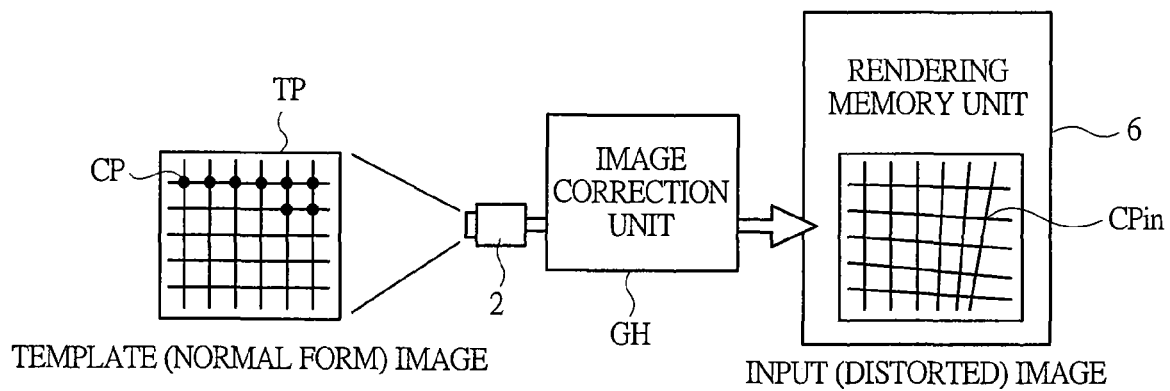
FIG. 4 is an explanation diagram of calculating processing of distortion information and image correction processing performed by the rendering processing display device in FIG. 1.
Figure 5:
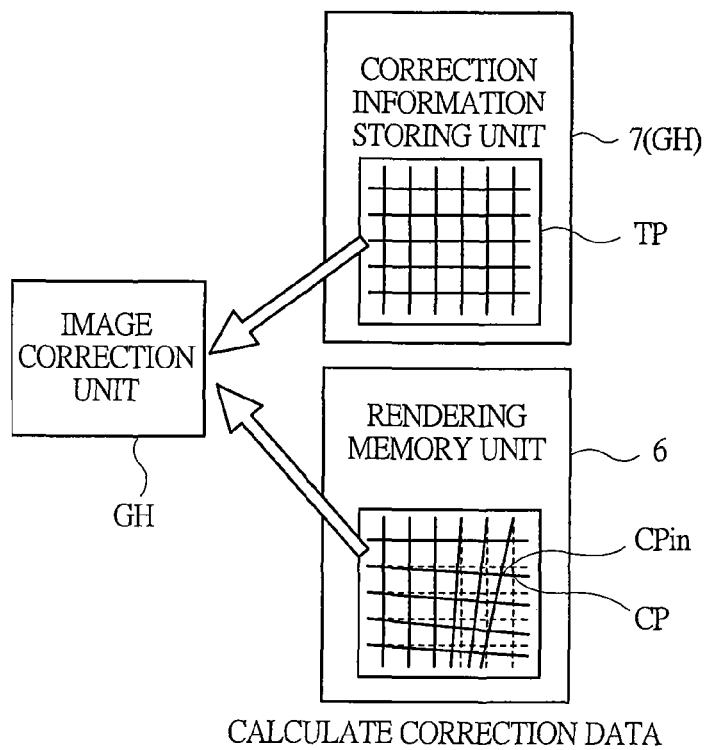
FIG. 5 is an explanation diagram following FIG. 4.
Figure 6:
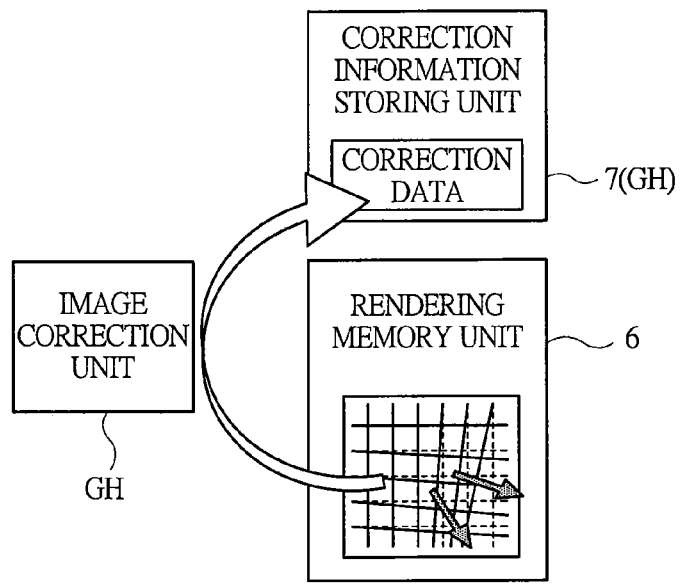
FIG. 6 is an explanation diagram following FIG. 5.
Figure 7:
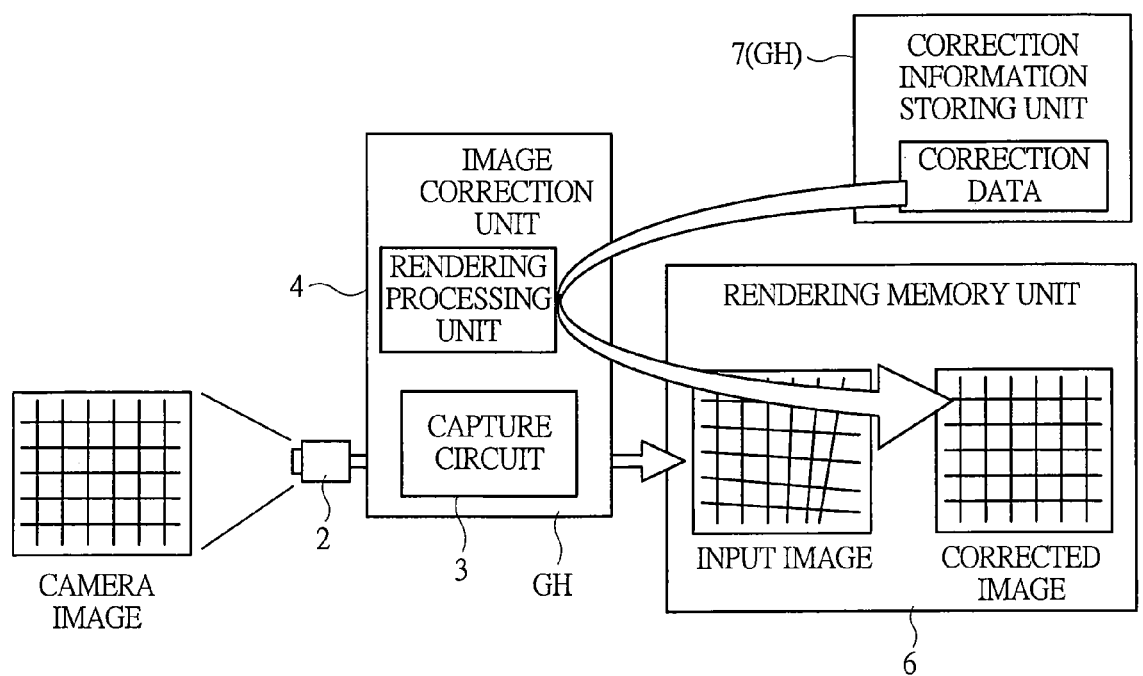
FIG. 7 is an explanation diagram following FIG. 6.
Figure 8:
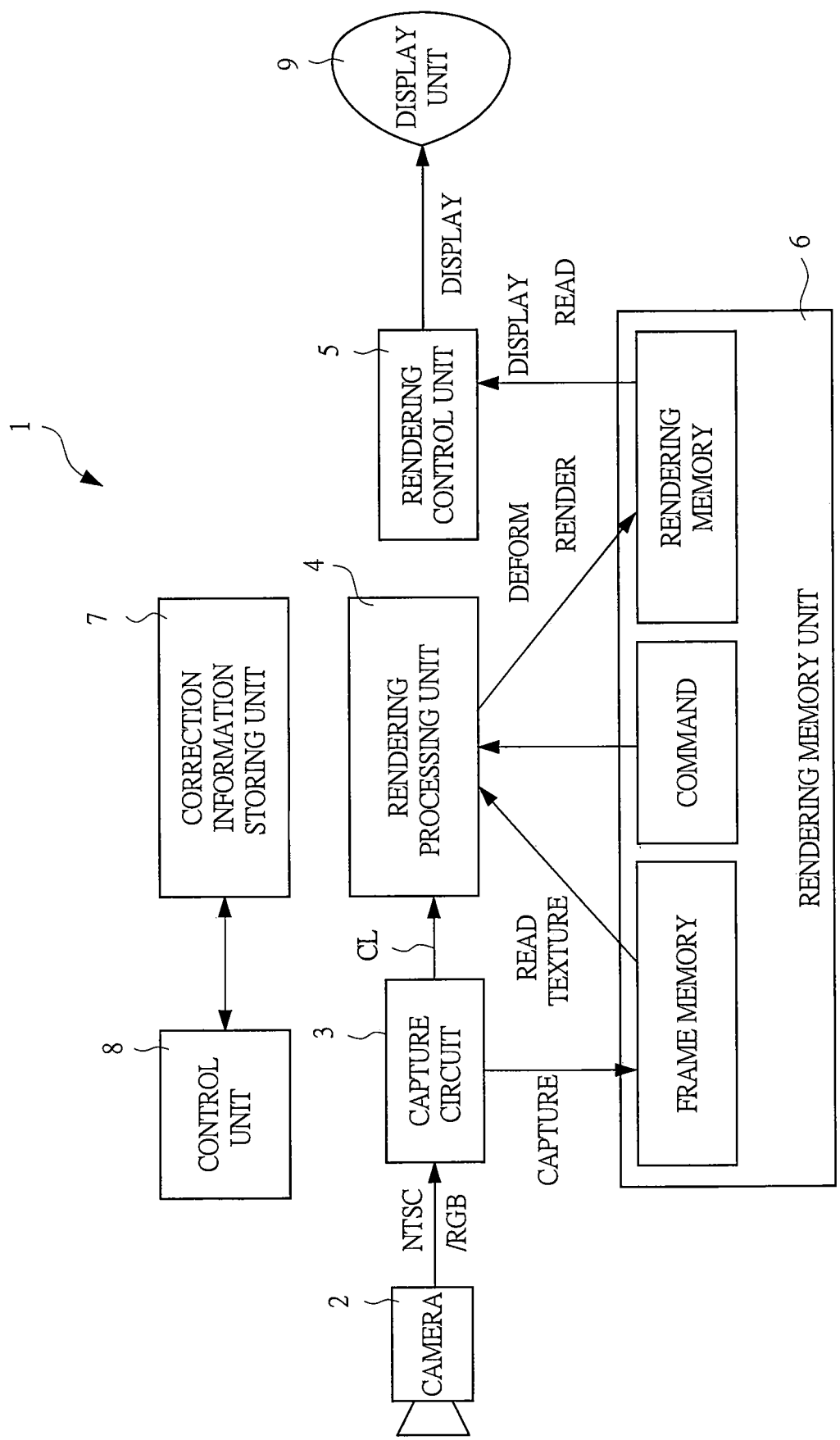
FIG. 8 is a block diagram showing another configuration example of the rendering processing display device in FIG. 1.
Figure 9:
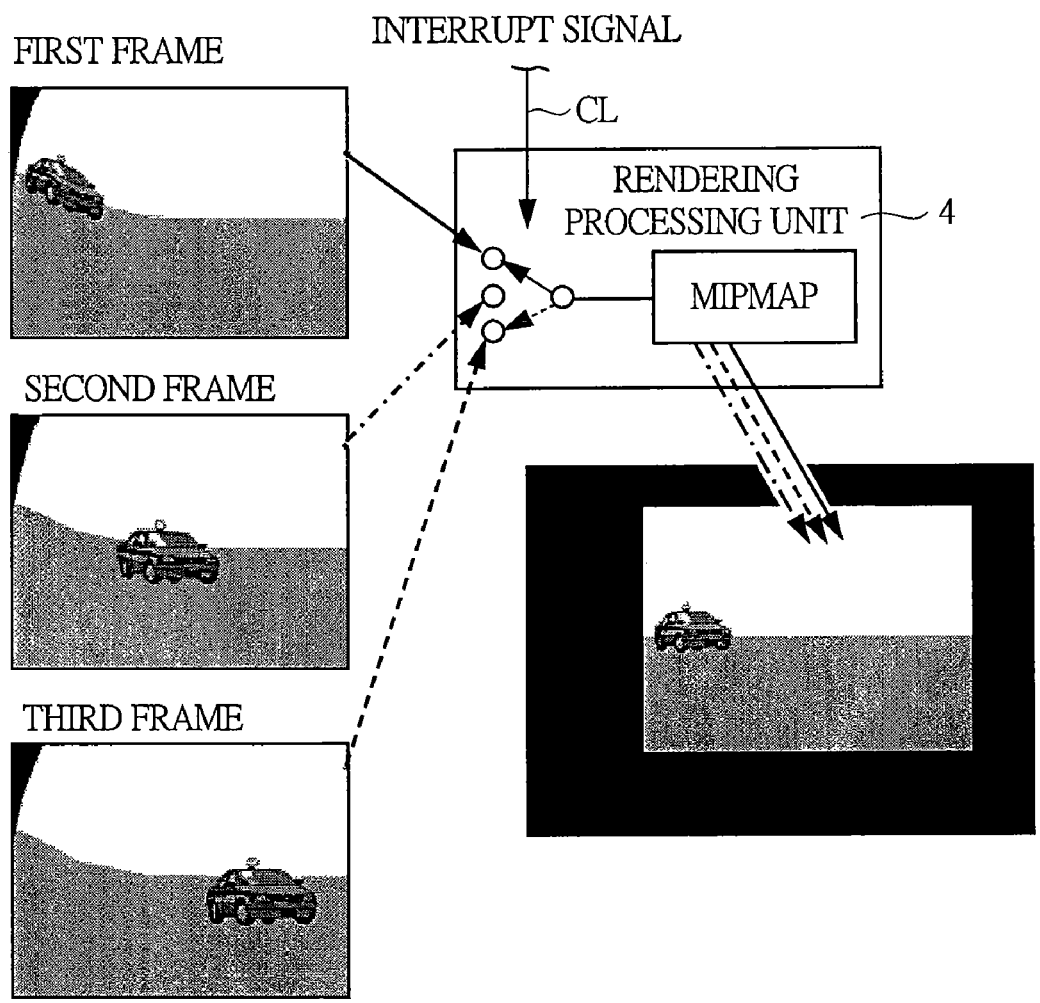
FIG. 9 is an explanation diagram of operation of reading a capture image from a frame memory and switching performed by a rendering processing unit provided in the rendering processing display device in FIG. 1.

FIG. 1 is a block diagram showing a configuration example of a rendering processing display device according to an embodiment of the present invention, FIG. 2 is an explanation diagram showing an example of image correction processing performed by the rendering processing display device in FIG. 1, FIG. 3 is an explanation diagram of acquisition of distortion information stored in a correction processing information storing unit provided in the rendering processing display device in FIG. 1, FIG. 4 is an explanation diagram of calculating processing of distortion information and image correction processing performed by the rendering processing display device in FIG. 1, FIG. 5 is an explanation diagram following FIG. 4, FIG. 6 is an explanation diagram following FIG. 5, FIG. 7 is an explanation diagram following FIG. 6, FIG. 8 is a block diagram showing another configuration example of the rendering processing display device in FIG. 1, and FIG. 9 is an explanation diagram of operation of reading a capture image from a frame memory and switching performed by a rendering processing unit provided in the rendering processing display device in FIG. 1.

In the present embodiment, a rendering processing display system 1 is a system in which a video captured by, for example, a camera is processed in real time and displayed. The rendering processing display system 1 is composed of a camera 2, a capture circuit 3, a rendering processing unit 4, a rendering control unit 5, a rendering memory unit 6, a correction information storing unit 7, a control unit 8, and a display unit 9, as shown in FIG. 1.

The camera 2 is provided plurally in number and mounted on, for example, an anterior bumper, a posterior bumper, right and left side mirrors and the like of a vehicle, respectively, and takes video of front, rear, and right and left of the vehicle, respectively.

The capture circuit 3, the rendering processing unit 4, the rendering control unit 5, the correction information storing unit 7, and the control unit 8 are formed, for example, as one semiconductor integrated circuit device. And, an image correcting unit GH is composed of the capture circuit 3, the rendering processing unit 4, and the correction information storing unit 7.

The capture circuit 3 functioning as a capture unit captures images taken by the camera 2. The rendering processing unit 4 functioning as an image processing unit is composed of, for example, a 3D (Dimension) rendering engine and the like, and performs rendering processing based on a command from the control unit 8. The rendering control unit 5 performs processing of actually displaying content rendered by the rendering processing unit 4.

The rendering memory unit 6 is composed of, for example, a volatile memory such as an SDRAM (Synchronous Dynamic Random Access Memory) or a DDR (Double Data Rate) SDRAM, and performs accumulation of a plurality of rendering commands outputted from the control unit 8, storage of a capture image captured by the capture circuit 3 (frame memory), and storage of a rendered image subjected to rendering processing by the rendering processing unit 4 (rendering memory).

The correction information storing unit 7 functioning as a correction information storing unit is composed of a nonvolatile semiconductor memory such as a flash memory and stores distortion information of images taken by the camera 2. The control unit 8 is composed of a CPU (Central Processing Unit) and the like and performs the whole control in the rendering processing display system 1 based on application.

The display unit 9 is composed of, for example, a monitor such as an LCD (Liquid Crystal Display), and displays image data outputted from the rendering control unit 5 as a video.

Next, an image processing technique of the rendering processing display system 1 according to the present embodiment will be explained.

FIG. 2 is an explanation diagram showing an example of image correction processing performed by the rendering processing display system 1, and images taken by the camera 2 mounted on the posterior bumper for capturing an image behind the vehicle are shown. An upper portion of FIG. 2 shows an example of images taken by the camera 2, and a lower portion thereof shows an example of corrected images displayed on the display unit 9.

In this case, the camera 2 mounted on the posterior bumper and the like is provided with lens divided into three parts and provided on its left, right, and downside, respectively.

As shown in the upper portion of FIG. 2, an image L of the divided lens in the left side, an image R of the divided lens in the right side, and an image D of the divided lens in the downside of the camera 2 with the lens divided into three parts are discontinuous. And distortion caused by a wide-angle lens is generated in the images.

After captured by the capture circuit 3 and stored in the frame memory of the rendering memory unit 6, the images L, R, and D of the camera 2 are subjected to image correction processing by the rendering processing unit 4.

The rendering processing unit 4 adds control points (black points shown in FIG. 2) CP to the images L, R, and D, respectively, based on the distortion information stored in the correction information storing unit 7. The control points CP are vertex information in a mesh region made by dividing the images L, R, and D into arbitrary regions.

The rendering processing unit 4 performs correction processing using an anti-aliasing function or the like so that the images become smooth, while correcting the images L, R, and D using, for example, a bilinear filter or the like.

In the correction, processing such that a distorted rectangle D1 of the mesh region formed when the control points CP in the images L, R, and D are connected to one another as shown in the upper portion of FIG. 2 becomes a square D2 as shown in the lower portion of FIG. 2 by moving the control points CP is performed.

Sequentially, the rendering processing unit 4 stores the images L, R, and D subjected to the correction processing in the rendering memory of the rendering memory unit 6. The stored images are subjected to display processing by the rendering control unit 5, and displayed on the display unit 9 as shown in the lower portion of FIG. 2.

Next, an acquisition technique of the distortion information stored in the correction information storing unit 7 will be explained using FIG. 3.

First, a template TP provided with the control points CP at even intervals is prepared. Then, an image of the template TP is taken by the camera 2, and the capture image is stored in the frame memory of the rendering memory unit 6 via the capture circuit 3.

Since the capture image Ca of the template stored in the frame memory includes distortion of an optical system of the camera 2, positions of some of the control points CP are not at even intervals due to the distortion.

Then, positional information of the control points CP of the capture image Ca stored in the frame memory is calculated as distortion information, and stored in the correction information storing unit 7. Since the calculating processing of distortion information is not required to be performed in real time, the processing is performed by the control unit 8.

Here, the calculating processing of distortion information and the image correction processing will be explained using operation explanation diagrams of FIG. 4 to FIG. 7.

First, as shown in FIG. 4, an image of the template TP is taken by the camera 2 and the image is stored in the frame memory of the rendering memory unit 6. Sequentially, as shown in FIG. 5, comparison between an image of an undistorted template TP of normal form preset in the correction information storing unit 7 and the image of the template TP taken by the camera 2 and stored in the rendering memory unit 6 is performed.

The template TP of normal form may be produced, for example, by calculation performed by the rendering processing unit 4, without presetting the template TP of normal form in the correction information storing unit 7.

The rendering processing unit 4 calculates a deviation amount (vector information) between the control points CP of the template TP of normal form and control points CP of the template TP taken by the camera 2 respectively using an image recognition (IMP) function, and stores the deviation amount as correction data (distortion information) in the correction information storing unit 7, as shown in FIG. 6.

With that, the calculation processing of distortion information is completed. This processing is not required to be performed in real time, and to be performed when calibration is required (for example, in the case where a tilt or torsion of the camera occurs or the like).

For example, a button (which is physical or of information processing) for instructing a calibration instruction of the camera 2 is provided in a vehicle navigation system or the like including the rendering processing display device according to the present invention, and calibration of the camera 2 is performed by pushing the button after the template TP is placed behind the vehicle.

And thereafter, in an ordinary use, as shown in FIG. 7, by performing correction processing of an inputted image explained in FIG. 2 based on the correction data stored in the correction information storing unit 7, the image is corrected and displayed.

And therefore, even if distortion caused by a tilt or torsion at installing or assembling of the camera 2 occurs, correction of a distorted image can be performed easily with high accuracy in short time, without adjusting the camera 2 itself.

The capture (inputted) image from the camera 2 described above is updated in real time (for example, about 30 fs to 60 fs). Generally, when the capture circuit 3 captures an image from the camera 2, an interrupt signal notifying update timing is outputted to the control unit 8, and upon reception of the interrupt signal, the control circuit 8 captures the image to be processed by the rendering processing unit 4 from the frame memory.

However, in the case where the control unit 8 controls reading texture (an inputted image) from the frame memory in response to the interrupt signal from the capture circuit 3, there is a possibility that real-time performance cannot be maintained due to a time lag of a response time of the interrupt signal or the like.

And therefore, as shown in FIG. 8, a configuration in which the update timing of an input image from the capture circuit 3 is notified without passing through the control unit 8 is employed.

In this case, as shown in FIG. 8, the capture circuit 3 and the rendering processing unit 4 are connected to each other with a dedicated line CL. In this configuration, the interrupt signal notifying the update timing outputted from the capture circuit 3 is directly inputted to the rendering processing unit 4 via this dedicated line. And thereby, since the intervention of the control unit 8 is removed, it becomes possible to achieve speeding-up of a processing speed, and real-time performance can be maintained.

Whenever an interrupt signal outputted from the capture circuit 3 is received via the dedicated line CL, the rendering processing unit 4 reads a capture image from the frame memory and switches the capture image, as shown in FIG. 9.

The switching of this capture image may be performed using an MIPMAP (Multum In Parvo MAPing) function provided in the rendering processing unit 4, which is a 3D rendering engine. The MIPMAP function is one of texture mapping techniques, and is a function performing switching textures according to dimensions of rendering size.

By performing the update of the capture image using this MIPMAP function, an addition of new hardware is not required, and therefore the update of the capture image from the camera 2 can be performed easily at low cost.

And therefore, according to the present embodiment, a distorted image taken by the camera 2 using a wide-angle lens or the like can be subjected to correction processing at high speed with high accuracy at low cost, so that higher-safety support of a vehicle can be performed.

And, in the present embodiment, the system has been described as a system in which a video taken by the camera 2 is processed in real time to be displayed, however, if an advanced image rendering system is provided in a vehicle or the like, the rendering processing display system 1 of the present invention can be realized using hardware of the image rendering system.

For example, in a vehicle navigation system, since hardware corresponding to the capture circuit 3, the rendering processing unit 4, the rendering control unit 5, the rendering memory unit 6, the control unit 8, and the display unit 9 in the rendering processing display system 1 is provided, the rendering processing display system 1 of the present invention can be realized at lower cost by diverting the hardware.

In the foregoing, the invention made by the inventor of the present invention has been concretely described based on the embodiments. However, it is needless to say that the present invention is not limited to the foregoing embodiments and various modifications and alterations can be made within the scope of the present invention.

The present invention is suitable for a distortion correction processing technique of an image captured from a camera used as safety support equipment.

What is claimed is:

1. A semiconductor integrated circuit device comprising:
an image correcting unit performing correction of an image taken by a camera by adding vertex information of a small region to the image based on distortion information and correcting distortion of the vertex information added to the image.

2. The semiconductor integrated circuit device according to claim 1,
wherein the image correcting unit comprises:
a capture unit capturing a picture taken by the camera as an image;
a correction information storing unit storing distortion information of an optical system of the camera; and
an image processing unit correcting the image by reading the image captured by the capture unit when an image capturing signal is inputted, adding the vertex information of the small region to the image based on the distortion information stored in the correction information storing unit, and correcting distortion of the vertex information added to the image.

3. The semiconductor integrated circuit device according to claim 2,
wherein the image capturing signal inputted to the image processing unit is a signal outputted by the capture unit to the image processing unit when the capture unit captures the image from the camera.

4. The semiconductor integrated circuit device according to claim 2,
wherein the image processing unit has a MIPMAP function and switches the corrected image using the MIPMAP function when the image capturing signal is inputted.

5. The semiconductor integrated circuit device according to claim 2,
wherein the distortion information stored in the correction information storing unit is composed of positional information of vertex information with distortion of the optical system of the camera added by capturing a template image with vertex information added at even intervals from the camera.

6. A rendering processing display system comprising:
a camera taking video;
a frame memory storing an image of the camera;
a rendering memory storing an image to be displayed;
a semiconductor integrated circuit device provided with an image correcting unit correcting distortion of an optical system of the camera in the image stored in the frame memory and outputting a corrected image; and
a display unit displaying the corrected image outputted from the semiconductor integrated circuit device,
wherein the image correcting unit comprises:
a capture unit capturing the video taken by the camera as an image and outputting the image to the frame memory;

a correction information storing unit storing distortion information of the optical system of the camera;

an image processing unit correcting the image by reading the image stored in the frame memory when an image capturing signal is inputted, adding vertex information of a small region to the image based on the distortion information stored in the correction information storing unit, and correcting distortion of the vertex information added to the image; and a rendering control unit performing display processing so that the corrected image stored in the rendering memory is displayed on the display unit.

7. A rendering processing display system comprising:

a camera taking video;

a frame memory storing an image of the camera;

a correction information storing unit storing distortion information of an optical system of the camera;

a rendering memory storing an image to be displayed;

a semiconductor integrated circuit device provided with an image correcting unit correcting distortion of the optical system of the camera in the image stored in the frame memory and outputting the corrected image; and a display unit displaying the corrected image outputted from the semiconductor integrated circuit device, wherein the image correcting unit comprises:

a capture unit capturing the video taken by the camera as an image and outputting the image to the frame memory;

a correction information storing unit storing the distortion information of the optical system of the camera;

an image processing unit correcting the image by reading the image stored in the frame memory when an image capturing signal is inputted, adding vertex information of a small region to the image based on the distortion information stored in the correction information storing unit, and correcting distortion of the vertex information added to the image; and a rendering control unit performing display processing so that the corrected image stored in the rendering memory is displayed on the display unit.

8. The rendering processing display system according to claim 6, wherein the image capturing signal inputted to the image processing unit is a signal outputted by the capture unit to the image processing unit when the capture unit captures the image from the camera.

9. The rendering processing display system according to claim 6, wherein the image processing unit has a MIPMAP function and switches the corrected image using the MIPMAP function when the image capturing signal is inputted.

10. The rendering processing display system according to claim 6, wherein the distortion information stored in the correction information storing unit is composed of positional information of vertex information with the distortion of the optical system of the camera added by capturing a template image with vertex information added at even intervals from the camera.

11. The rendering processing display system according to claim 6, wherein the image processing unit compares an undistorted normal image of a template with vertex information added at even intervals and an image of the template captured from the camera, calculates a deviation amount between the vertex information of the normal image of the template and the vertex information of the template captured from the camera, and stores the deviation amount of each vertex information in the correction information storing unit as distortion data.

12. The rendering processing display system according to claim 11, wherein the normal image of the template compared by the image processing unit is preliminarily stored in the correction information storing unit.

* * * * *